United States Patent [19]
Montano

[11] 3,709,054
[45] Jan. 9, 1973

[54] CHAIN CONNECTING LINK

[75] Inventor: Joseph V. Montano, West Hartford, Conn.

[73] Assignee: Litton Industrial Systems, Inc.

[22] Filed: Oct. 20, 1970

[21] Appl. No.: 82,249

[52] U.S. Cl. .................................................. 74/258
[51] Int. Cl. ............................................... F16g 13/02
[58] Field of Search ......... 74/258, 254, 245 R, 251 R

[56] References Cited

UNITED STATES PATENTS

| 1,121,053 | 12/1914 | Terry | 74/258 |
|---|---|---|---|
| 617,716 | 1/1899 | Caldwell | 74/258 |
| 2,775,156 | 12/1956 | Imse et al. | 74/258 X |

Primary Examiner—Leonard H. Gerin
Attorney—John D. Boos and John D. Lister

[57] ABSTRACT

A connecting link for power transmission chain is disclosed having two identical half link sub-assemblies. Each sub-assembly comprises a link plate having a laterally-extending pin at one end thereof and an aperture formed at the other end thereof. Two of these sub-assemblies are designed to be assembled into a connecting link by having the pin on one sub-assembly extend through the aperture in the link plate of the other sub-assembly. The sub-assemblies are held in assembled position by two spring clips which are attached to both pins at either side of the connecting link.

10 Claims, 3 Drawing Figures

PATENTED JAN 9 1973

3,709,054

INVENTOR
Joseph V. Montano
BY John D Boos
ATTORNEY

CHAIN CONNECTING LINK

BACKGROUND OF THE INVENTION

This invention relates to power transmission chain and, more particularly, to a connecting link for coupling and uncoupling roller chain together. The term "roller chain" refers to a chain which is generally provided with rollers but the term, as currently employed in the trade and as employed herein, also includes a similar chain design without individual rollers.

Roller chain conventionally comprises alternating roller links and pin links coupled together. The roller links are usually composed of two link plates interconnected by two bushings which are press-fitted into apertures in each of the plates. The pin link is formed with pins extending through the bushings of adjacent roller links and which pins are interconnected by two pin link plates, each of which is provided with two apertures and into which are fitted each of the pins. The pins are generally secured in position by spinning or swaging both ends of each pin or, alternatively, by spinning or swaging the ends on only one side of each pin but with a hole drilled in the other end thereof so as to receive a cotter pin. In order to readily facilitate coupling and uncoupling separate lengths of such roller chain together, or to form a single length of chain into an endless chain, connecting links are frequently employed.

As shown in U. S. Pat. No. 580,449, these connecting links are typically formed with a pin link sub-assembly, a cover plate, and a single spring clip retaining device. The sub-assembly comprises a link plate having apertures formed in the ends thereof and into which apertures are press-fitted pins which extend outwardly from one side thereof. The pins in the sub-assembly are designed to extend through the end bushings of the lengths of chain which are to be coupled together, and the cover plate, which is formed with apertures in the ends thereof, is designed to be slip-fitted over these pins and held in position by a single spring clip. In a like manner, opposite ends of a single length of chain can be coupled together so as to form an endless chain.

While this type of connecting link has proved suitable for many applications, it has created certain serious problems when employed on drive chain which is frequently subjected to severe vibration, severe centrifugal forces, overloads, and/or frequent shockloads, or which is employed with misaligned sprockets. As an example, a number of these conditions are frequently experienced by drive chains employed on motorcycles. When one or more of these conditions are experienced, it has been found that the spring clips are frequently pushed off of the pins or are broken so as to thereby enable the cover plate to work its way off the ends of the chain pins and enable the pin link sub-assembly to become separated from the drive chain. If this should occur during the operation of the drive chain, it could potentially damage surrounding equipment and could injure personnel in the area. In the case of the motorcycle usage, there have been instances where such connecting link failure has occurred, resulting in serious injury to personnel on the motorcycle.

Additional prior art connecting links such as disclosed in U. S. Pat. Nos. 632,856 and 3,379,072 have been designed but are thought to be unsatisfactory either because of the above-described problems or because they do not readily facilitate coupling and uncoupling of the chain. Likewise, additional patents, such as U. S. Pat. No. 741,455, disclose chain links which can be readily coupled and uncoupled together but which have a relatively greater number of parts that can be lost and which are generally thought to be more expensive to produce. Thus, there still remains a definite need for a connecting link having a small number of parts which can be readily coupled and uncoupled together and which greatly resists failure during severe operating conditions.

SUMMARY OF THE INVENTION

According to the present invention, there is provided a connecting link having two identical half link sub-assemblies. Each sub-assembly comprises a link plate having a laterally extending pin press-fitted into an aperture at one end of the link plate and a second aperture formed at the other end thereof which is sized to be a slide-fit with the pin of the other sub-assembly. The ends of each pin are formed with grooves therein and the pin is designed such that the grooves are positioned on the outside of the link plates when the sub-assemblies are assembled together. The sub-assemblies are assembled together with the pin of each link plate extending through the aperture in the other link plate. A spring clip is snapped into the grooves of both pins at each side of the connecting link so as to secure the sub-assemblies in their assembled position.

Accordingly, one object of the present invention is to provide a connecting link which is readily coupled and uncoupled together and which can be employed in connection with chain which is subjected to severe operating conditions.

Another object of the invention is to provide a connecting link having a relatively small number of parts which are designed to be readily coupled and uncoupled together.

A third object of the invention is to provide a connecting link designed to employ two spring clip retaining means holding the connecting link in assembled position and requiring the removal of both retaining means before the connecting link can be disassembled.

BRIEF DESCRIPTION OF THE DRAWING

Other objects, advantages, and novel features of the present invention will become apparent in the following description of the invention when considered in connection with the drawings herein.

DESCRIPTION OF THE PREFERRED EMBODIMENT

Figure 1:
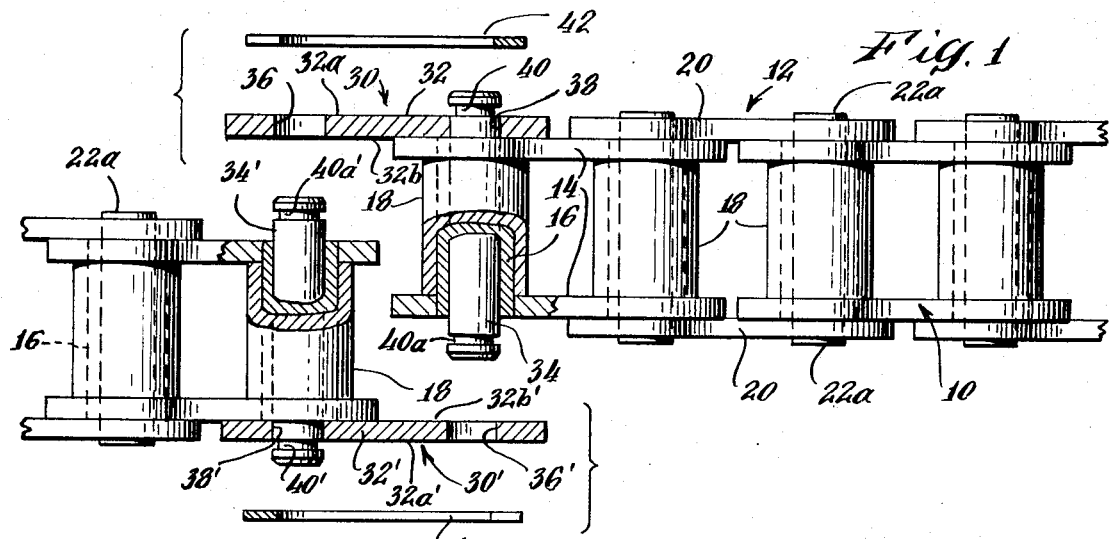
FIG. 1 is a plan view of a length of a chain embodying the present invention with parts broken away and sectioned for ease of understanding and showing an exploded view of the connecting link.

As seen in the drawing, the roller chain is made up of alternating roller links 10 and pin links 12 coupled together so as to form a series of articulated links. Each roller link is composed of two link plates 14 interconnected by bushings 16 which are press-fitted into the ends of link plates 14. Rotatably mounted on bushings 16 are rollers 18. The pin links 12 are formed with pins 22 extending through, and being rotatably mounted in, the bushings of the adjacent roller links and with the pins 22 being press-fitted into apertures formed in the ends of the pin link plates 20. The ends of the pins are swaged as seen at 22a.

The connecting link comprises two identical half link sub-assemblies 30-30', only one of which will be described in detail; however, it will be understood that corresponding parts of the second sub-assembly are marked with the same reference numerals but are followed by a prime mark (e.g., 30'). Each sub-assembly has a link plate 32 formed with a pin 34 projecting laterally therefrom at one end thereof and which plate is also formed with an aperture 36 therein at the other end thereof. In the preferred embodiment, pin 34 is made as a separate piece and is press-fitted into an aperture 38 formed in the link plate. Aperture 36 has a slightly larger diameter than aperture 38 which facilitates assembling and disassembling two identical sub-assemblies into a connecting link as will hereinafter be described.

At each end of the pin a shallow groove 40, 40a is formed about the neck thereof. As seen in FIG. 1, the pin extends through plate 32 such that the first groove 40 at one end of the pin is immediately adjacent the outside face 32a while the second groove 40a at the other end of the pin is spaced some distance from the inside face 32b of the link plate 32. The pin is dimensioned such that when two identical sub-assemblies are assembled together, the second groove 40a is immediately adjacent the outside plate face 32a' of the cooperating sub-assembly.

As seen in FIG. 1, the pin 34 of the sub-assembly is designed to extend through the bushing of the end link that is to be connected. The pin 34' of a second identical sub-assembly is designed to extend through the bushing of the other end link that is to be coupled to the first end link. Each sub-assembly is then brought together with a pin 34 extending through aperture 36' while pin 34' extends through aperture 36. While apertures 38, 38' are sized so as to create a press fit with pins 34, 34' respectively, apertures 36, 36' have a diameter, or are sized, so as to create a slide fit or a drive fit with the pins 34', 34 respectively, and in this manner assembling and disassembling is readily facilitated.

Figure 2:
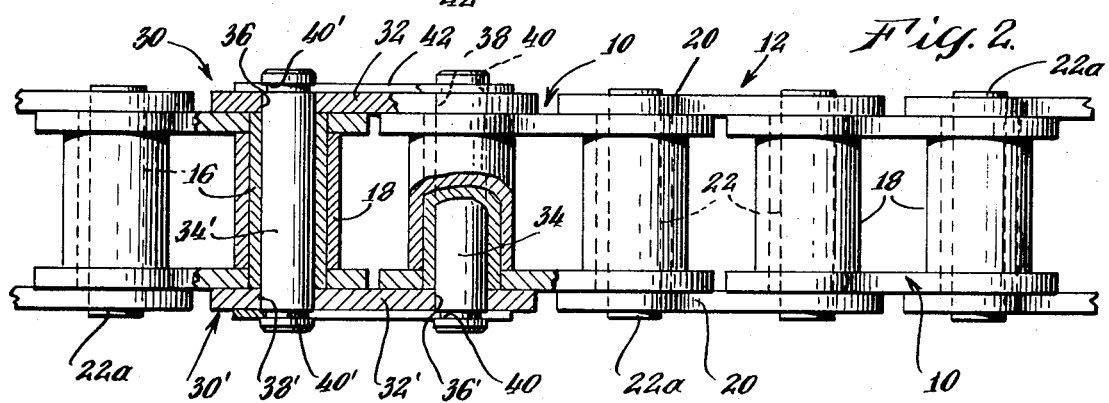
FIG. 2 is a plan view similar to FIG. 1 but showing the connecting link fully assembled and secured by the two spring clips.
Figure 3:
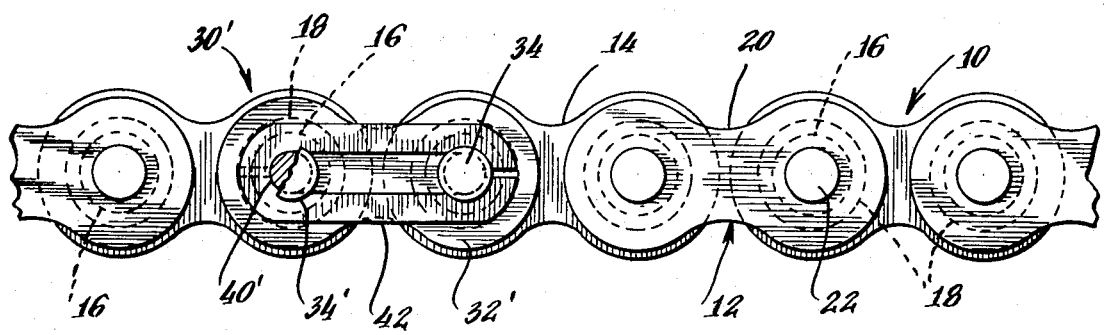
FIG. 3 is a side view of FIG. 2.

When the two identical sub-assemblies are assembled together, as shown in FIG. 2, the sub-assemblies are secured in position by two detachable retaining means 42, 42' which in the preferred embodiment are conventional split spring retaining clips that are snapped onto both pins 34, 34' at either side of the assembled connecting link. Specifically, clip 42 is shown attached to the pins on one side of the connecting link immediately adjacent outside face 32a' and positioned in grooves 40', 40a, while clip 42' is attached to the pins on the other side of the connecting link, immediately adjacent outside face 32a', and positioned in grooves 40, 40'. Each of the spring clips are designed to be readily snapped on and off the ends of the pins in a manner known in the art. It will be apparent that each spring clip independently holds the assembled sub-assemblies together, and that both spring clips must be removed before the assembled sub-assemblies can be separated.

It will also be apparent from the above description that two identical half link sub-assemblies comprise the connecting link of the present invention. There are no separate pins, bushings, etc., which can be accidentally lost when the connecting link is in a disassembled state. Furthermore, and more importantly, the specific sub-assemblies are designed so as to receive two detachable retaining means which are coupled to both pins in the connecting link. It is this arrangement which helps insure against accidental disassembly of the connecting link when employed on a chain which is employed in severe operating conditions. Finally, the use of spring clips as the detachable retaining means readily facilitates the quick assembly and disassembly of the connecting link.

Obviously, many modifications and variations of the present invention are possible in light of the above teachings. For example, in the preferred embodiment the link plate and pin which comprise each sub-assembly are disclosed as being made separately and then joined together; however, it will be readily apparent that the link plate and pin can be made as an integral unit by, for example, conventional powdered metallurgical techniques. It is therefore to be understood that the invention may be practiced otherwise than as is specifically described herein.

What is claimed is:

1. In combination, a connecting link for use with roller chain, said connecting link comprising two half link sub-assemblies, each of said sub-assemblies formed with a link plate and a pin extending laterally therefrom, each of said link plates formed with a first aperture therein, said sub-assemblies being assembled together with the pin of one sub-assembly extending through the first aperture in the link plate of the other sub-assembly, two retaining means securing the assembled sub-assemblies together, each of said retaining means being detachably coupled to the pins of both sub-assemblies.

2. The combination defined in claim 1 wherein each of said link plates are formed with a second aperture therein, the pin and link plate of each sub-assembly being assembled with the pin thereof extending through, and being press-fitted in, the second aperture of the link plate of the sub-assembly.

3. The combination defined in claim 2 wherein both sub-assemblies are identical, and wherein the first aperture in the link plate of each sub-assembly is sized so as to readily receive the pin of the other sub-assembly.

4. The combination defined in claim 2 wherein each of said pins are formed with a groove at each end thereof and wherein each of said retaining means is a spring clip, one of said spring clips being coupled onto one end of the pins of both sub-assemblies at one side of the assembled connecting link, the other of said spring clips being coupled onto the other end of the pins of both sub-assemblies at the other side of the assembled connecting link, each of said spring clips being positioned in at least a portion of one of the grooves formed in each of said pins.

5. The combination defined in claim 1 wherein each of said retaining means is a spring clip, one of said spring clips being coupled onto said pins at one side of said connecting link and the other of said spring clips being coupled onto said pins at the other side of said connecting link.

6. A roller chain having articulated links and a connecting link interconnecting the end links of the chain so as to form the roller chain into an endless chain, said connecting link comprising two link plates, each of said link plates having a pin projecting laterally therefrom and formed with a first aperture therein, said connecting link being assembled together with the pin of one sub-assembly extending through the first aperture in the link plate of the other sub-assembly, two detachable retaining means securing the assembled connecting link together, and each of said retaining means being coupled to the pins of both sub-assemblies.

7. The combination defined in claim 6 wherein the link plates of each sub-assembly are formed with a second aperture therein, the pin and link plate of each sub-assembly being assembled with the pin thereof extending through, and being press-fitted in, the second aperture of the link plate of the sub-assembly.

8. The combination defined in claim 7 wherein both sub-assemblies are identical, and wherein the first aperture in the link plate of each sub-assembly is sized so as to readily receive the pin of the other sub-assembly.

9. The combination defined in claim 7 wherein each of said pins are formed with a groove at each end thereof and wherein each of said retaining means is a spring clip, one of said spring clips being coupled onto one end of the pins of both sub-assemblies at one side of the assembled connecting link, the other of said spring clips being coupled onto the other end of the pins of both sub-assemblies at the other side of the assembled connecting link, each of said spring clips being positioned in at least a portion of one of the grooves formed in each of said pins.

10. The combination defined in claim 6 wherein each of said retaining means is a spring clip, one of said spring clips being coupled onto said pins at one side of said connecting link and the other of said spring clips being coupled onto said pins at the other side of said connecting link.

* * * * *